US012682424B2

(12) United States Patent
Chien et al.

(10) Patent No.: US 12,682,424 B2
(45) Date of Patent: Jul. 14, 2026

(54) METHOD FOR IDENTIFYING TRAFFIC SIGN AND RELATED DEVICES

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 480 days.

(21) Appl. No.: 18/207,698

(22) Filed: Jun. 9, 2023

(65) Prior Publication Data

US 2024/0311967 A1      Sep. 19, 2024

(30) Foreign Application Priority Data

Mar. 13, 2023    (CN) .......................... 202310238409.6

(51) Int. Cl.
| | |
|---|---|
| *G06T 5/50* | (2006.01) |
| *G06T 7/11* | (2017.01) |
| *G06T 7/174* | (2017.01) |
| *G06T 7/194* | (2017.01) |
| *G06T 7/70* | (2017.01) |
| *G06V 10/774* | (2022.01) |
| *G06V 20/60* | (2022.01) |

(52) U.S. Cl.
CPC .................. *G06T 5/50* (2013.01); *G06T 7/11* (2017.01); *G06T 7/174* (2017.01); *G06T 7/194* (2017.01); *G06T 7/70* (2017.01); *G06V 10/774* (2022.01); *G06V 20/60* (2022.01); *G06T*

*2207/10024* (2013.01); *G06T 2207/20081* (2013.01); *G06T 2207/20216* (2013.01); *G06T 2207/30252* (2013.01)

(58) Field of Classification Search
None
See application file for complete search history.

(56) References Cited

FOREIGN PATENT DOCUMENTS

| | | | | | |
|---|---|---|---|---|---|
| CN | 108154102 A | * | 6/2018 | ........... | G06F 18/214 |
| CN | 111242046 A | * | 6/2020 | ........... | G06F 18/241 |
| CN | 112101283 A | * | 12/2020 | ............. | G06F 18/22 |
| CN | 116453086 A | * | 7/2023 | ........... | G06V 20/582 |
| CN | 116486369 A | * | 7/2023 | ........... | G06V 20/582 |

* cited by examiner

*Primary Examiner* — Jiangeng Sun
(74) *Attorney, Agent, or Firm* — ScienBiziP, P.C.

(57)      ABSTRACT

A method for identifying traffic sign is provided. The method obtains an original image of a traffic sign, and performs an image enhancing processing on the original image to form an enhanced image. The method performs a first conversion on the original image and the enhanced image to together form a first matrix of image data, and identifies a position of the traffic sign accordingly. The method further masks the original image and the enhanced image respectively to form a first identified region of the original image and a second identified region of the enhanced image accordingly. The method further performs a second conversion on the first identified region and the second identified region to together form a second matrix of the identified region of the image data, and identifies passage instruction information of the traffic sign accordingly. An electronic device and a non-transitory storage medium are also disclosed.

20 Claims, 7 Drawing Sheets

METHOD FOR IDENTIFYING TRAFFIC SIGN AND RELATED DEVICES

FIELD

The subject matter herein generally relates to an image processing technology, and particularly to a method for identifying traffic sign and related devices.

BACKGROUND

To identify a traffic sign erected on or above a road, one or more compared characteristics are determined manually by an operator, a position of the traffic sign is mechanically identified from a captured image via a characteristic comparing, an image of the traffic sign can be accordingly extracted from the captured image, and then passage instruction information of the traffic sign can be identified from the image of the traffic sign. The passage instruction information can be, for example a value of a speed limit, and so on. However, the captured image is easy to be affected by some factors, for example, a lighting, a capturing angle, a size of the traffic sign, a deformation of the traffic sign, and so on. Thus, an identifying result may be error.

SUMMARY

An embodiment of the present application provides a method of identifying traffic sign and related devices which can improve an accuracy for identifying the traffic sign.

In a first aspect, an embodiment of the present application provides a method of identifying traffic sign. The method obtains an original image of a traffic sign, and performs an image enhancing processing on the original image to form an enhanced image. The method performs a first conversion on the original image and the enhanced image to together form a first matrix of image data, and identifies a position of the traffic sign from the first matrix of the image data. The method further masks the original image and the enhanced image respectively to form a first identified region of the original image and a second identified region of the enhanced image according to the position of the traffic sign. Wherein masking the original image and the enhanced image is obscuring other region of the original image and other region of the enhanced image excluding the position of the traffic sign, and remaining the traffic sign in the original image and the traffic sign in the enhanced image. The method performs a second conversion on the first identified region of the original image and the second identified region of the enhanced image to together form a second matrix of the identified region of the image data. The method further identifies passage instruction information of the traffic sign from the second matrix of the identified region of the image data. Where the passage instruction information is configured to provide guiding information, limitation information, warning information, or indicating information.

The method performs the first conversion on the original image and the enhanced image to together form the first matrix of image data, and identifies the position of the traffic sign from the first matrix of the image data. Because the image enhancing processing can enhance an outline of the traffic sign, thus the traffic sign is more obvious in the background in the enhanced image, and an accuracy of the identification of the position of the traffic sign can be improved. The method further respectively masks the original image and the enhanced image to form a first identified region of the original image and a second identified region of the enhanced image according to the position of the traffic sign, thus interferences of the backgrounds in the original image and in the enhanced image can be reduced. The method further performs the second conversion on the first identified region of the original image and the second identified region of the enhanced image to together form the second matrix of the identified region of the image data, and identifies the passage instruction information of the traffic sign from the second matrix of the identified region of the image data. Because an outline of the passage instruction information of the traffic sign in the second identified region of the enhanced image is more obvious, thus a case of an unobvious outline of the passage instruction information of the traffic sign which is caused by the lighting can be reduced. Therefore, an accuracy of the identification of the passage instruction information of the traffic sign can be improved.

In a second aspect, an embodiment of the present application provides an electronic device. The electronic device includes a storage device and at least one processor. The storage device stores one or more programs, which when executed by the at least one processor, cause the at least one processor to obtain an original image of a traffic sign, and perform an image enhancing processing on the original image to form an enhanced image. The electronic device further causes the at least one processor to perform a first conversion on the original image and the enhanced image to together form a first matrix of image data, and identify a position of the traffic sign from the first matrix of the image data. The electronic device further causes the at least one processor to mask the original image and the enhanced image respectively to form a first identified region of the original image and a second identified region of the enhanced image according to the position of the traffic sign, and perform a second conversion on the first identified region of the original image and the second identified region of the enhanced image to together form a second matrix of the identified region of the image data. The electronic device further causes the at least one processor to identify passage instruction information of the traffic sign from the second matrix of the identified region of the image data.

In a third aspect, an embodiment of the present application provides a non-transitory storage medium. The non-transitory storage medium stores a set of commands, when the commands being executed by at least one processor of an electronic device, causing the at least one processor to obtain an original image of a traffic sign, and perform an image enhancing processing on the original image to form an enhanced image. The non-transitory storage medium further causes the at least one processor to perform a first conversion on the original image and the enhanced image to together form a first matrix of image data, and identify a position of the traffic sign from the first matrix of the image data. The non-transitory storage medium further causes the at least one processor to mask the original image and the enhanced image respectively to form a first identified region of the original image and a second identified region of the enhanced image according to the position of the traffic sign, and perform a second conversion on the first identified region of the original image and the second identified region of the enhanced image to together form a second matrix of the identified region of the image data. The non-transitory storage medium further causes the at least one processor to identify passage instruction information of the traffic sign from the second matrix of the identified region of the image data.

Details of the second aspect, the third aspect, and their implementation embodiments can refer to the description of the first aspect and the implementation embodiments of the first aspect, and details are not described herein again. Advantages of the second aspect, the third aspect, and their implementation embodiments can refer to advantages of the first aspect and the implementation embodiments of the first aspect, and details are not described herein again.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
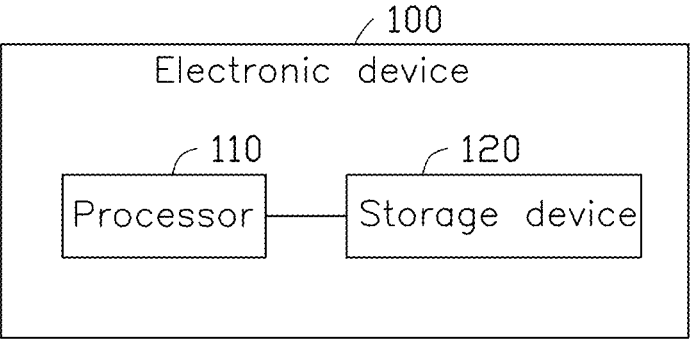
FIG. 1 is a block diagram of an embodiment of an electronic device.

It should be understood that, a term "at least one" means one or more, a term "a plurality of" means two or more. A term "and/or" is only an associative relationship for describing associated objects, indicating that three relationships may exist, for example, A and/or B, which may indicate three situations: A exists independently; A and B exist simultaneously; and B exists independently. Where, A, B may be singular or plural. Terms such as "first", "second", "third", "fourth", and so on (if existed) in the specification, the claims, and the accompanying drawings of the present disclosure are used to distinguish similar objects, and are not intended to describe specific sequence or order.

It should be noted that, the method shown in a method or a flowchart disclosed in the embodiments includes one or more steps for implementing the method. The steps of the method may be interchanged with one another and/or deleted without departing from the scope of the claims.

Road traffic sign identification is widely used in an Advanced Driving Assistant System (ADAS). Road traffic sign identification mainly depends on capturing an image via an in-vehicle camera, performing a vision algorithm processing on the image to identify the traffic sign from the image. In detail, to identify the traffic sign erected on or above a road, one or more compared characteristics are determined manually by an operator, a position of the traffic sign is mechanically identified from a captured image via a characteristic comparing, an image of the traffic sign can be accordingly extracted from the captured image, and then passage instruction information of the traffic sign can be identified from the image of the traffic sign. The passage instruction information can be, for example a value of a speed limit, and so on. However, the captured image has some limitations, for example the captured image is easy to be affected by a lighting, a capturing angle, a size of the traffic sign, a deformation of the traffic sign, and so on. Thus, an identifying result may be error.

Thus, a method for identifying traffic sign and related devices are provided in the disclosure. The disclosure performs an image enhancing processing on an original image to form an enhanced image, performs a first conversion on the original image and the enhanced image to together form a first matrix of image data, and identifies a position of the traffic sign from the first matrix of the image data. Because the image enhancing processing can enhance an outline of the traffic sign, thus the traffic sign is more obvious in the background in the enhanced image, and an accuracy of the identification of the position of the traffic sign can be improved. The disclosure further respectively masks the original image and the enhanced image to form a first identified region of the original image and a second identified region of the enhanced image according to the position of the traffic sign, thus interferences of the backgrounds in the original image and in the enhanced image can be reduced. The disclosure further performs a second conversion on the first identified region of the original image and the second identified region of the enhanced image to together form a second matrix of the identified region of the image data, and identifies the passage instruction information of the traffic sign from the second matrix of the identified region of the image data. The passage instruction information is configured to provide guiding information, limitation information, warning information, or indicating information. Because an outline of the passage instruction information of the traffic sign in the second identified region of the enhanced image is more obvious, thus a case of an unobvious outline of the passage instruction information of the traffic sign which is caused by the lighting can be reduced. Therefore, an accuracy of the identification of the passage instruction information of the traffic sign can be improved.

The following describes an electronic device of the embodiment.

FIG. 1 is a block diagram of an embodiment of an electronic device.

Referring to FIG. 1, the electronic device 100 can include at least one processor 110 and a storage device 120. Where, the at least one processor 110 can run or execute one or more computer programs or codes stored in the storage device 120, and accomplish the method for identifying traffic sign of the embodiment.

In the embodiment, the at least one processor 110 can be configured to: obtain the original image of the traffic sign, perform the image enhancing processing on the original image to form the enhanced image, perform the first conversion on the original image and the enhanced image to together form the first matrix of the image data, identify the position of the traffic sign from the first matrix of the image data. The at least one processor 110 can be further configured to: respectively mask the original image and the enhanced image to form the first identified region of the original image and the second identified region of the enhanced image according to the position of the traffic sign, perform the second conversion on the first identified region of the original image and the second identified region of the enhanced image to together form the second matrix of the identified region of the image data, and identify the passage instruction information of the traffic sign from the second matrix of the identified region of the image data.

The at least one processor 110 may include one or more processing unit. For example, the at last one processor 110 may include, but is not limited to an application processor (AP), a modem processor, a graphics processing unit (GPU), an image signal processor (ISP), a controller, a video codec, a digital signal processor (DSP), a baseband processor, a neural-network processing unit (NPU), and so on. Difference processing units can each be a stand-alone device or together integrated into one or more processors.

The at least one processor 110 further includes a storage unit to store commands and data. In some embodiments, the storage unit of the at least one processor 110 can be a cache memory. The storage unit can reserve the commands or data used recently or used for recycling by the at least one processor 110. When the at least one processor 110 needs to use the commands or data again, the at least one processor 110 can directly call out the commands and data from the storage unit.

In some embodiments, the at least one processor 110 may include one or more interfaces. The one or more interfaces may include, but is not limited to, an Inter-Integrated Circuit (I2C) interface, an Inter-Integrated Circuit Sound (I2S) interface, a Pulse Code Modulation (PCM) interface, a Universal Asynchronous Receiver/Transmitter (UART) interface, a Mobile Industry Processor Interface (MIPI), a General-Purpose Input/Output (GPIO) interface, a Subscriber Identity Module (SIM) interface, a Universal Serial Bus (USB) interface, and so on.

It can be understood that, the connection relation between the interfaces of the illustrated modules is only an example, and does not be considered as limiting of the electronic device 100. In another embodiment, the electronic device 100 may employ an interface coupling manner different from the manner of the aforementioned embodiment, or employ a combination of a number of interface coupling manners.

The storage device 120 may include an external storage device interface and an internal storage device. Where, the external memory interface may be configured to connect to an external memory card such as a micro SD card, to extend a storage capability of the electronic device 100. The external storage card communicates with the processor 110 through the external memory interface, to implement a data storage function. The internal storage may be configured to store computer-executable program code. The executable program code includes instructions. The internal storage device may include a program area and a data area. The program area can store an operating system, and applications that are required for the at least one function, such as sound playback features, images playback functions, and so on. The data area can store data created according to the use of the electronic device 100 100, such as audio data, image data, and so on. In addition, the internal storage device can include a high-speed random access memory and a non-transitory storage medium, such as a disk memory, a flash card, or a Universal Flash Storage (UFS), and so on. The at least one processor 110 can run one or more commands stored in the internal storage device, and/or one or more commands stored in the storage unit of the at least one processor 110, to accomplish various function applications and data processing of the electronic device 100, for example the method for identifying traffic sign of the embodiment.

It can be understood that, the electronic device 100 in FIG. 1 is only an example, and does not be considered as limiting of the electronic device 100. In another embodiment, the electronic device 100 may include more or fewer parts than the FIG. 1, or combine of certain parts, or split some parts, or includes different parts. The parts in the FIG. 1 may be performed by processing logic in hardware, software, or a combination thereof.

The electronic device 100 may be a vehicle terminal, a mobile terminal, an in-vehicle infotainment device, an in-vehicle computer, or an instant vehicle. The vehicle terminal can be integrated into the instant vehicle, and be communicationally coupled to a vehicle camera. The mobile terminal can be not integrated into the instant vehicle. The mobile terminal can be a smart phone, a tablet PC, a personal digital assistant (PDA), and the like.

The following will take the electronic device 100 as an example to illustrate the method for identifying traffic sign of the embodiment.

Figure 2:
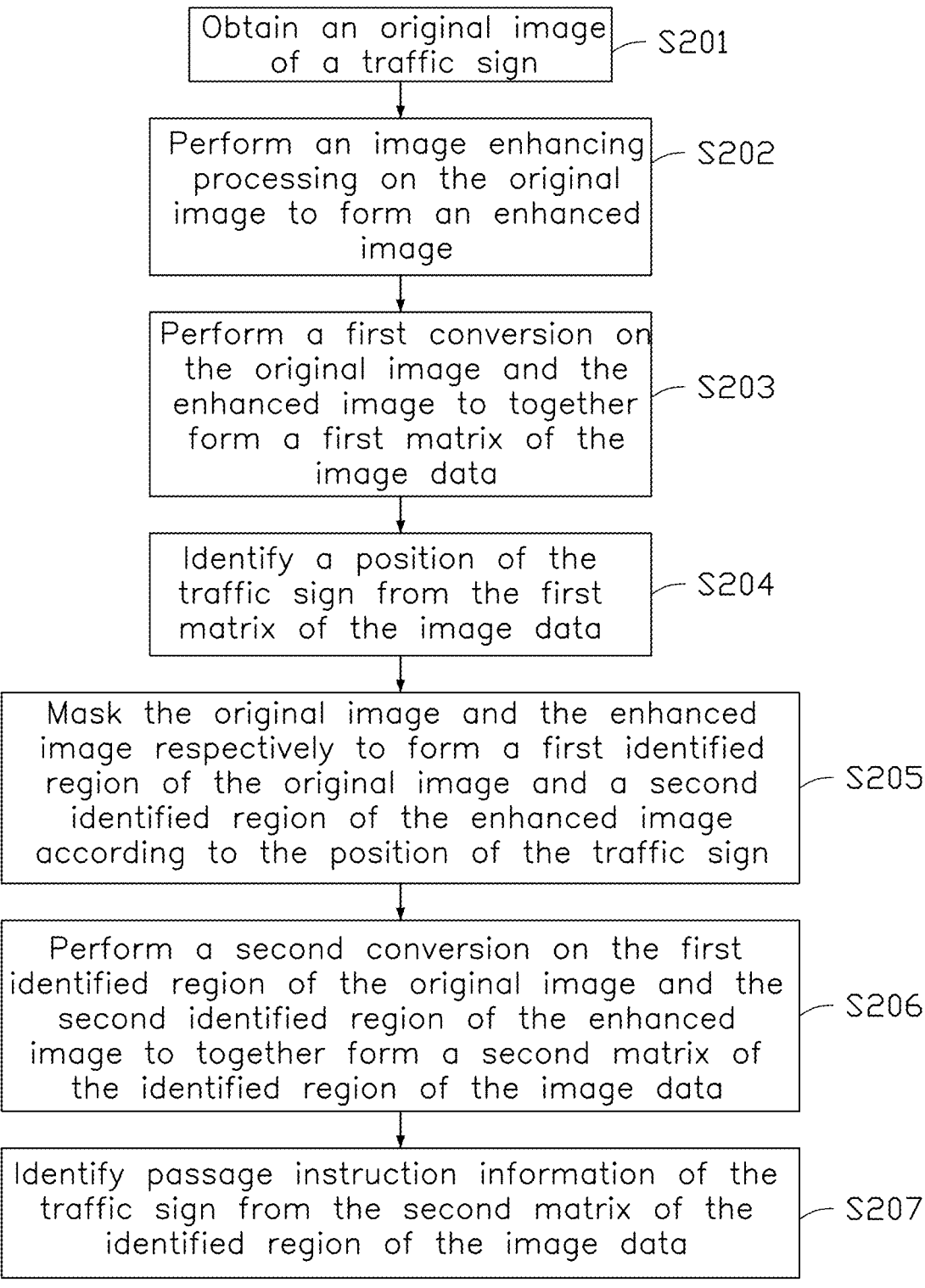
FIG. 2 is a flowchart of an embodiment of a method for identifying traffic sign.

FIG. 2 is a flowchart of an embodiment of a method for identifying traffic sign.

Referring also to FIG. 2, the method for identifying traffic sign can include:

S201, obtaining the original image of the traffic sign.

In some embodiments, the electronic device 100 is communicationally coupled to the vehicle camera of the instant vehicle. The electronic device 100 can call the vehicle camera to capture the original image of the traffic sign within a predetermined range in front of the instant vehicle, and obtain the original image of the traffic sign from the vehicle camera. Where, the predetermined range is a field of view of the vehicle camera.

In some embodiments, the electronic device 100 includes a camera. The electronic device 100 can capture the original image of the traffic sign within the predetermined range in front of the instant vehicle via the camera of the electronic device 100. Where, the predetermined range is a field of view of the camera of the electronic device 100.

In some embodiments, the electronic device 100 can access an internet of vehicle (IoV). The electronic device 100 can obtain the original image of the traffic sign within the predetermined range from the other vehicle in the IoV. Where, the predetermined range is a field of view of the vehicle camera of the other vehicle in the IoV.

S202, performing the image enhancing processing on the original image to form the enhanced image.

In the embodiment, the image enhancing processing is processing some degradation image features in the original image. Some degradation image features can be, for example one or more borders, one or more outlines, a contrast, and so on.

It can be understood that, the original image is easy to be affected by some factors, for example a lighting, a capturing angle, a size of the traffic sign, a deformation of the traffic sign, and so on. Thus, some image features may be degraded. Compared to the original image, the enhanced image which is after the image enhancing processing can have a better visual effect and a higher definition.

S203, performing the first conversion on the original image and the enhanced image to together form the first matrix of the image data.

In the embodiment, the electronic device 100 can perform a matrix transformation on the original image and the enhanced image, and to convert the image data of the original image and the image data of the enhanced image to together form the first matrix of the image data. Where, the image data can include a size of the image and channel data of the image. The size of the image can include a length and a width. The length and the width each can be represented via the number of pixel points. The channel data can include one or more pixel values of each pixel point in each channel. For example, the channel data of the RGB color image includes pixel values of each pixel point in three channels which are respective a red channel, a green channel, and a blue channel. For example, the channel data of the grayscale image includes a pixel value of each pixel point in a single channel.

For example, the first matrix of the image data can be:

$$\begin{bmatrix} (x_{11}, y_{11}, z_{11}) & \cdots & (x_{1m}, y_{1m}, z_{1m}) & (x_{1(m+1)}, y_{1(m+1)}, z_{1(m+1)}) & \cdots & (x_{1(2m)}, y_{1(2m)}, z_{1(2m)}) \\ \vdots & \ddots & \vdots & \vdots & \ddots & \vdots \\ (x_{n1}, y_{n1}, z_{n1}) & \cdots & (x_{nm}, y_{nm}, z_{nm}) & (x_{n(m+1)}, y_{n(m+1)}, z_{n(m+1)}) & \cdots & (x_{n(2m)}, y_{n(2m)}, z_{n(2m)}) \end{bmatrix}$$

Where, $(x_{nm}, y_{nm}, z_{nm})$ represents a channel data of the pixel point in a nth row and a mth column of the original image. $x_{nm}$, $y_{nm}$, and $z_{nm}$ represent a pixel value of the pixel point in the nth row and the mth column of the original image respectively in the three channels which are respective a red channel, a green channel, and a blue channel. A size of the original image and a size of the enhanced image are the same, respectively are n*m. n, and m each is an integer greater than one. $(x_{1(m+1)}, y_{1(m+1)}, z_{1(m+1)})$ represents a channel data of the pixel point in a first row and a first column of the enhanced image. $x_{1(m+1)}$, $y_{1(m+1)}$, and $z_{1(m+1)}$ represent a pixel value of the pixel point in the first row and the first column of the enhanced image respectively in the three channels which are respective the red channel, the green channel, and the blue channel. $(x_{n(2m)}, y_{n(2m)}, z_{n(2m)})$ represents a channel data of the pixel point in the nth row and the mth column of the enhanced image. $x_{n(2m)}$, $y_{n(2m)}$, and $z_{n(2m)}$ represent a pixel value of the pixel point in the nth row and the mth column of the enhanced image respectively in the three channels which are respective the red channel, the green channel, and the blue channel.

S204, identifying the position of the traffic sign from the first matrix of the image data.

In the embodiment, the electronic device 100 can store a first reference characteristic of each traffic sign in each standard image of one or more standard images. The standard images are captured in advance. Each first reference characteristic includes a set of the pixel points of the outline of a corresponding traffic sign. After forming the first matrix of the image data, the electronic device 100 can poll each pixel point in the first matrix of the image data, and to determine whether the first reference characteristic is existed in the first matrix of the image data. When the first reference characteristic is polled to be in the first matrix of the image data, the electronic device 100 can extract the first reference characteristic from the first matrix of the image data, thus the position of the traffic sign can be identified. When the first reference characteristic is not polled to be in the first matrix of the image data, the electronic device 100 can determine that the identification is failed, and obtain a new original image of the traffic sign and a new enhanced image of the traffic sign, to form a new first matrix of the image data, and identify continuously a new position of the traffic sign according to the new first matrix of the image data until the identification is successful.

It can be understood that, the first matrix of the image data includes image data of the original data and image data of the enhanced image. When some image features of the original image are degraded, thus the position of the traffic sign can be difficult to identify from the image data of the original data, the electronic device 100 can extract the image data from a position in the enhanced image which is the same position as a position of the original data. Because the outline of the traffic sign in the enhanced image is more obvious, thus the position of the traffic sign can be efficiently identified.

For example, supposing a pixel point $(x_{nm}, y_{mm}, z_{nm})$ of the aforementioned first matrix of the image data is one pixel point of the outline of the traffic sign. When the pixel value in a position of the pixel point $(x_{nm}, y_{nm}, z_{nm})$ is lost, the electronic device 100 can extract the pixel value in a position of the pixel point $(x_{n(2m)}, y_{n(2m)}, z_{n(2m)})$. The pixel point $(x_{n(2m)}, y_{n(2m)}, z_{n(2m)})$ is after the image enhanced processing, and the pixel value of the pixel point $(x_{n(2m)}, y_{n(2m)}, z_{n(2m)})$ is more accurate.

S205, masking the original image and the enhanced image respectively to form the first identified region of the original image and the second identified region of the enhanced image according to the position of the traffic sign. Where, the masking is obscuring other region of the original image and other region of the enhanced image excluding the position of the traffic sign, and remaining the traffic sign in the original image and the traffic sign in the enhanced image.

In the embodiment, the electronic device 100 masks the original image and the enhanced image, thus interferences of backgrounds of the original image and the enhanced image can be reduced, and the first identified region of the original image and the second identified region of the enhanced image each adjacent to the position of the traffic sign can be remained. Where, the first identified region of the original image and the second identified region of the enhanced image are a partial image adjacent to the position of the traffic sign respective in the original image and the enhanced image.

It can be understood that, a size of the first identified region of the original image and a size of the second identified region of the enhanced image are the same.

S206, performing the second conversion on the first identified region of the original image and the second identified region of the enhanced image to together form the second matrix of the identified region of the image data.

In the embodiment, the electronic device 100 can perform a matrix transformation on the first identified region of the original image and the second identified region of the enhanced image, and to convert the image data of the first identified region of the original image and the image data of the second identified region of the enhanced image to together form the second matrix of the identified region of the image data.

It can be understood that, the second matrix of the identified region of the image data is a submatrix of the first matrix of the image data in the step S203.

S207, identifying passage instruction information of the traffic sign from the second matrix of the identified region of the image data. The passage instruction information is configured to provide guiding information, limitation information, warning information, or indicating information.

In some embodiments, the passage instruction information can be a text composed of one or more characters, one or more patterns, a combination of the text and the one or more patterns, and so on. The passage instruction information can be, for example a value of a speed limit, or the like.

In the embodiment, the electronic device 100 can store a second reference characteristic of the passage instruction information of each traffic sign in each standard image. Each second reference characteristic includes a set of the pixel points of the passage instruction information of the corresponding traffic sign. After forming the second matrix of the identified region of the image data, the electronic device 100 can poll each pixel point in the second matrix of the identified region of the image data, and to determine whether the second reference characteristic is existed in the second matrix of the identified region of the image data. When the second reference characteristic is polled to be in the second matrix of the identified region of the image data, the electronic device 100 can extract the second reference characteristic from the second matrix of the identified region of the image data, thus the passage instruction information of the traffic sign can be identified. When the second reference characteristic is not polled to be in the second matrix of the identified region of the image data, the electronic device 100 can determine that the identification is failed, and mask continuously the original image and the enhanced image, form continuously a new second matrix of the identified region of the image data, and identify continuously new passage instruction information of the traffic sign until the identification is successful.

It can be understood that, the second matrix of the identified region of the image data includes the image data of the first identified region of the original data and the image data of the second identified region of the enhanced image. When some image features of the first identified region of the original image are degraded, thus the passage instruction information of the traffic sign can be difficult to identify from the image data of the first identified region of the original data, the electronic device 100 can extract the image data from a position in the second identified region of the enhanced image which is the same position as a position of the first identified region of the original data. Because the outline of the passage instruction information of the traffic sign in the second identified region of the enhanced image is more obvious, thus the passage instruction information of the traffic sign can be efficiently identified.

In the embodiment, the electronic device 100 performs the image enhancing processing on the original image to form the enhanced image, performs the first conversion on the original image and the enhanced image to together form the first matrix of the image data, and identifies the position of the traffic sign from the first matrix of the image data. Because the image enhancing processing can enhance the outline of the traffic sign, thus the traffic sign is more obvious in the background in the enhanced image, and an accuracy of the identification of the position of the traffic sign can be improved. The electronic device 100 further respectively masks the original image and the enhanced image to form the first identified region of the original image and the second identified region of the enhanced image according to the position of the traffic sign, thus interferences of the backgrounds of the original image and the enhanced image can be reduced. The electronic device 100 further performs a second conversion on the first identified region of the original image and the second identified region of the enhanced image to together form the second matrix of the identified region of image data, and identifies the passage instruction information of the traffic sign from the second matrix of the identified region of the image data. Because the outline of the passage instruction information of the traffic sign in the second identified region of the enhanced image is more obvious, thus the case of the unobvious outline of the passage instruction information of the traffic sign which is caused by the lighting can be reduced. Therefore, an accuracy of the identification of the passage instruction information of the traffic sign can be improved.

In some embodiments, the enhanced image can include at least one of a grayscale enhanced image and a RGB color enhanced image.

In one embodiment, the image enhancing processing can include a step a1 and a step a2. The step a1 includes converting the original image to the grayscale image. The step a2 includes performing a histogram averaging or a deep learning processing on the grayscale image to obtain the grayscale enhanced image.

In another embodiment, the image enhancing processing can include performing a histogram averaging or a deep learning processing on the original image to obtain the RGB color enhanced image.

It can be understood that, a type of the enhanced image can include one or more, for example at least one of the grayscale enhanced image and the RGB color enhanced image. The outlines of the traffic signs in the grayscale enhanced image and the RGB color enhanced image are more obvious, thus an accuracy of the identification of the position of the traffic sign can be improved.

In another embodiment, the identifying the position of the traffic sign from the first matrix of the image data includes inputting the first matrix of the image data into a first trained identifying network for the traffic sign, to identify the position of the traffic sign from the first matrix of the image data.

It can be understood that, the identifying network for the traffic sign is configured to identify the position of the traffic sign from the first matrix of the image data. The identifying network for the traffic sign can include, but is not limited to, a SegNet network, a U-Net network, a Fully Convolution Network (FCN) network, or the like.

In one embodiment, before the inputting the first matrix of the image data into the first trained identifying network for the traffic sign, the method further includes training the identifying network for the traffic sign. The training the identifying network for the traffic sign can include a step b1, a step b2, a step b3, a step b4, a step b5, and a step b6. The step b1 includes obtaining a first training sample set of the original image of the traffic sign. The first training sample set of the original image is a set of the original images labeled the positions of the traffic signs. The step b2 includes performing the image enhancing processing on each original image of the first training sample set to generate a number of corresponding enhanced images. The step b3 includes performing the third conversion on each original image and a corresponding enhanced image to together form a number of third matrixes of the image data. The step b4 includes inputting the third matrixes of the image data into a first to-be-trained identifying network for the traffic sign. The step b5 includes repeating the cycle of training the first to-be-trained identifying network for the traffic sign for a predetermined number of cycles. The step b6 includes obtaining a network weight of the first to-be-trained identifying network for the traffic sign when the training is completed, to generate the first trained identifying network for the traffic sign.

In the embodiment, during each cycle of the training of the first to-be-trained identifying network for the traffic sign, the original images of the first training sample set are selected to perform the image enhancing processing one by one to generate the corresponding enhanced images. And, each original image and the corresponding enhanced image are performed the third conversion to together form the third matrix of the image data. Then, the third matrixes of the image data are inputted into the first to-be-trained identifying network for the traffic sign one by one. Thus, one cycle of the training is completed. When the electronic device 100 completes the predetermined number of cycles of the training, or when or after a loss function of the first to-be-trained identifying network for the traffic sign reaches a minimum value, the training can be ended. At the moment, the network weight of the first to-be-trained identifying network for the traffic sign can be a network weight of the first trained identifying network for the traffic sign.

It can be understood that, the number of the original images of the first training sample set is greater than or equal to the predetermined number of cycles. The predetermined number of cycles can be set according to the need. For example, the number of the original images of the first training sample set is 5000, and the predetermined number of cycles is 500, the disclosure is not limited herein.

In another embodiment, the identifying the passage instruction information of the traffic sign from the second matrix of the identified region of the image data includes inputting the second matrix of the identified region of the image data into a second trained identifying network for the passage instruction information, to identify the passage instruction information of the traffic sign from the second matrix of the identified region of the image data.

It can be understood that, the identifying network for the passage instruction information is configured to identify the passage instruction information of the traffic sign from the second matrix of the identified region of the image data. The identifying network for the passage instruction information can be a tiny Yolo network.

In one embodiment, before the inputting the second matrix of the identified region of the image data into the second trained identifying network for the passage instruction information, the method further includes training the identifying network for the passage instruction information. The training the identifying network for the passage instruction information can include a step c1, a step c2, a step c3, a step c4, a step c5, and a step c6. The step c1 includes obtaining a second training sample set of the first identified region of the original image of the traffic sign. The second training sample set of the first identified region of the original image is a set of the first identified region of the original images labeled positions and types of the passage instruction information of the traffic signs. The step c2 includes performing the image enhancing processing on each first identified region of the original image of the second training sample set of to generate a number of corresponding identified regions of the enhanced images. The step c3 includes performing a fourth conversion on each first identified region of the original image and a corresponding second identified region of the enhanced image to together form a number of fourth matrixes of the identified region of the image data. The step c4 includes inputting the fourth matrixes of the identified region of the image data into a second to-be-trained identifying network for the passage instruction information. The step c5 includes repeating the cycle of training the second to-be-trained identifying network for the passage instruction information for a predetermined number of cycles. The step c6 includes obtaining a network weight of the second to-be-trained identifying network for the passage instruction information when the training is completed, to generate the second trained identifying network for the passage instruction information.

In the embodiment, during each cycle of the training of the second to-be-trained identifying network for the passage instruction information, the first identified regions of the original images of the second training sample set are selected to perform the image enhancing processing one by one to generate the corresponding identified regions of the enhanced images. And, each first identified region of the original image and the corresponding second identified region of the enhanced image are performed the fourth conversion to together form the fourth matrix of the identified region of the image data. Then, the fourth matrixes of the identified regions of the image data are inputted into the second to-be-trained identifying network for the passage instruction information one by one. Thus, one cycle of the training is completed. When the electronic device 100 completes the predetermined number of cycles of the training, or when or after a loss function of the second to-be-trained identifying network for the passage instruction information reaches a minimum value, the training can be ended. At the moment, the network weight of the second to-be-trained identifying network for the passage instruction information can be a network weight of the second trained identifying network for the passage instruction information.

It can be understood that, the number of the first identified regions of the original images of the second training sample set is greater than or equal to the predetermined number of cycles. The predetermined number of cycles can be set according to the need. For example, the number of the first identified regions of the original images of the second training sample set is 5000, and the predetermined number of cycles is 500, the disclosure is not limited herein.

The following will take identifying a speed limit traffic sign in the backlight scenario as an example to illustrate the method for identifying traffic sign.

Figure 3:
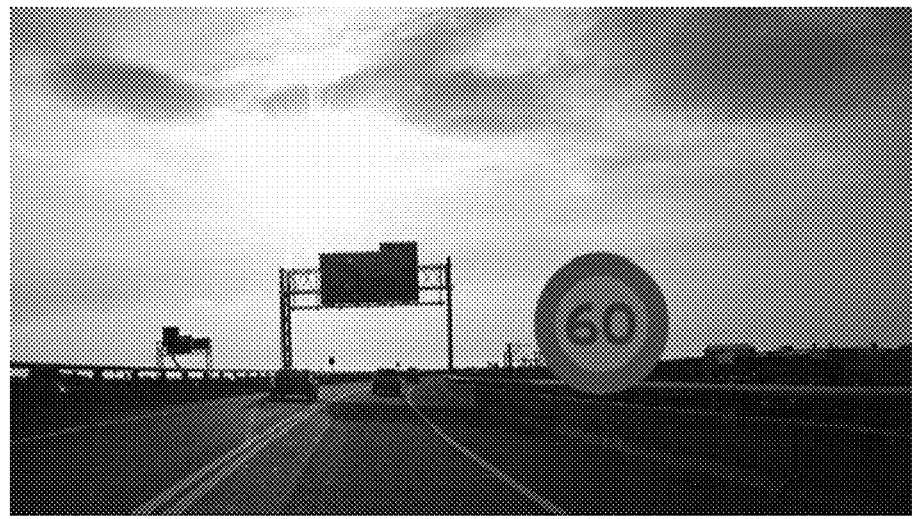
FIG. 3 is a view of an embodiment of an original image captured in a backlight scenario.

Referring to FIG. 3, a view of the original image captured in the backlight scenario is shown. Although FIG. 3 is shown as a grayscale image, but it can be understood that, the original image captured in the backlight scenario in real is a RGB color image. The electronic device obtains the original image of the speed limit traffic sign. As shown in the FIG. 3, the original image is affected by the lighting, thus the outline of the speed limit traffic sign is rather blurry in the background of the original image.

Figure 4:
FIG. 4 is a view of an embodiment of a grayscale enhanced image in a backlight scenario.
Figure 5:
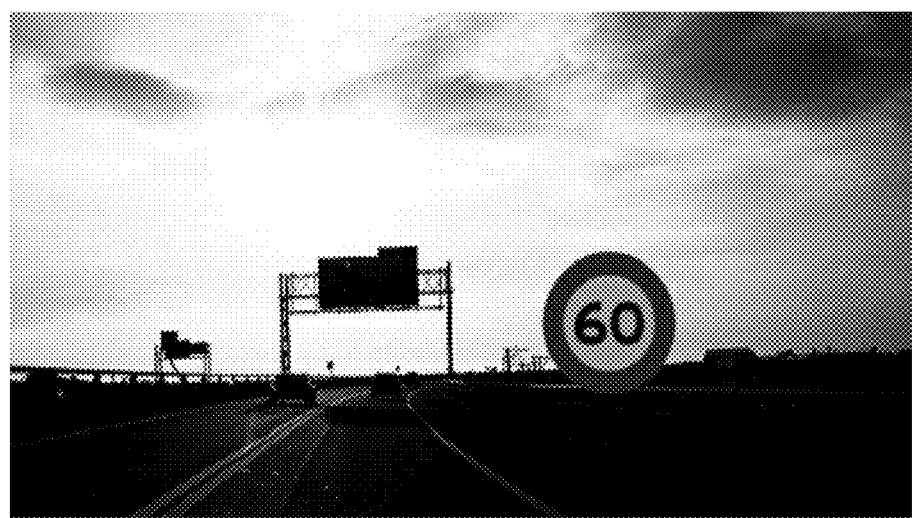
FIG. 5 is a view of an embodiment of a color enhanced image in a backlight scenario.
Figure 6:
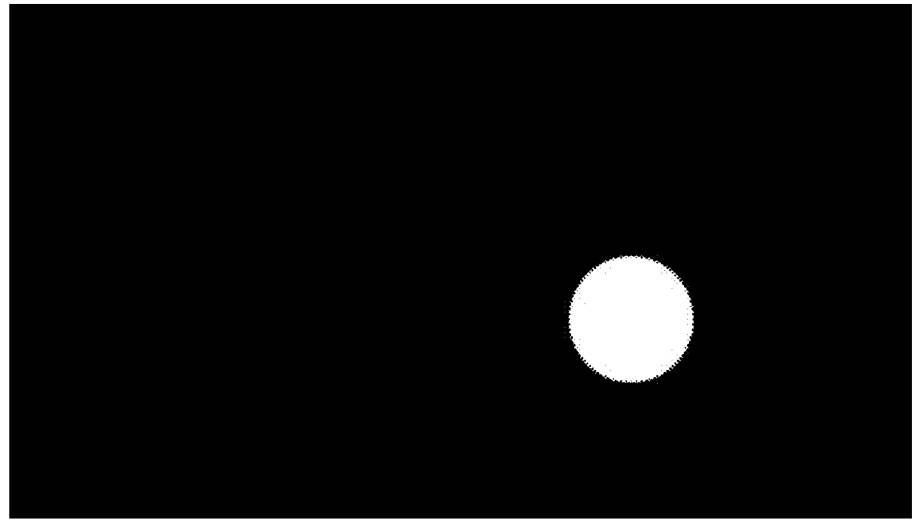
FIG. 6 is a view of an embodiment showing a masking.

Referring to FIGS. 4-5, FIG. 4 shows a view of the grayscale enhanced image in the backlight scenario, FIG. 5 shows a view of the RGB color enhanced image in the backlight scenario. Although FIG. 5 is shown as a grayscale image, but it can be understood that, the RGB color enhanced image in real is a RGB color image. The electronic device performs the image enhancing processing on the original image to form the grayscale enhanced image and the RGB color enhanced image. As shown in the FIGS. 4-5, the outline of the speed limit traffic sign in the grayscale enhanced image and the outline of the speed limit traffic sign in the RGB color enhanced image each is more obvious.

Figure 7:
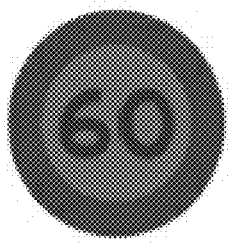
FIG. 7 is a view of an embodiment of an identified region of an original image.
Figure 8:
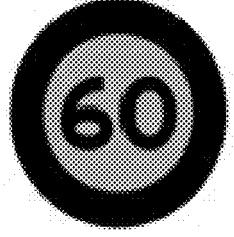
FIG. 8 is a view of an embodiment of an identified region of a grayscale enhanced image.
Figure 9:
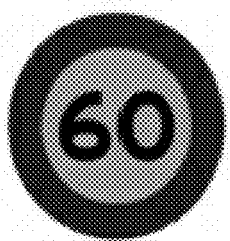
FIG. 9 is a view of an embodiment of an identified region of a color enhanced image.

Referring to FIGS. 6-9, FIG. 6 is a view showing the masking, FIG. 7 shows a view of the identified region of the original image, FIG. 8 shows a view of the identified region of the grayscale enhanced image, FIG. 9 shows a view of the identified region of the RGB color enhanced image. Although FIG. 9 is shown as a grayscale image, but it can be understood that, the identified region of the RGB color enhanced image in real is a RGB color image. The electronic device performs the first conversion on the original image, the grayscale enhanced image, and the RGB color enhanced image to together form the first matrix of the image data, and identifies the position of the speed limit traffic sign from the first matrix of the image data. The electronic device further respectively masks the original image, the grayscale enhanced image, and the RGB color enhanced image, and to form the first identified region of the original image, the identified region of the grayscale enhanced image, and the identified region of the RGB color enhanced image according to the position of the speed limit traffic sign. After the masking, as shown in the FIGS. 7-9, the first identified region of the original image, the identified region of the grayscale enhanced image, and the identified region of the RGB color enhanced image each has filtered out the interference of the background, and remains the region adjacent to the position of the speed limit traffic sign. Where, the outlines of the speed limit traffic signs in the identified region of the grayscale enhanced image and the identified region of the RGB color enhanced image each is more obvious. Subsequently, the electronic device performs the second conversion on the first identified region of the original image, the identified region of the grayscale enhanced image, and the identified region of the RGB color enhanced image to together form the second matrix of the identified region of the image data, and identifies the passage instruction information of the speed limit traffic sign from the second matrix of the identified region of the image data. Thus, the electronic device can identify the value in each position of the speed limit traffic sign, for example identifying a value in a position of the units and a value in a position of the tens to be 0 and 6. Thus, the electronic device can determine that the value of the speed limit, for example determine that the value of the speed limit is 60, namely identify the passage instruction information is 60.

The disclosure further provides a computer-readable storage medium configured to store one or more programs. When the commands being executed by at least one processor of an electronic device, causing the at least one processor to accomplish the steps of the exemplary method for identifying traffic sign.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for identifying traffic sign comprising:
   obtaining an original image of a traffic sign;
   performing a first conversion on the original image and an enhanced image to together form a first matrix of image data, wherein the enhanced image is formed by an image enhancing processing on the original image;
   identifying a position of the traffic sign from the first matrix of the image data;
   masking the original image and the enhanced image respectively to form a first identified region of the original image and a second identified region of the enhanced image according to the position of the traffic sign; wherein masking the original image and the enhanced image is obscuring other region of the original image and other region of the enhanced image excluding the position of the traffic sign, and remaining the traffic sign in the original image and the traffic sign in the enhanced image;
   performing a second conversion on the first identified region of the original image and the second identified region of the enhanced image to together form a second matrix of the identified region of the image data; and
   identifying passage instruction information of the traffic sign from the second matrix of the identified region of the image data, where the passage instruction information is configured to provide guiding information, limitation information, warning information, or indicating information.

2. The method according to claim 1, wherein the image enhancing processing on the original image is further formed by:
   converting the original image to a grayscale image;
   performing a histogram averaging or a deep learning processing on the grayscale image to obtain a grayscale enhanced image.

3. The method according to claim 1, wherein the image enhancing processing on the original image is further formed by:
   performing a histogram averaging or a deep learning processing on the original image to obtain a RGB color enhanced image.

4. The method according to claim 1, wherein identifying the position of the traffic sign from the first matrix of the image data further comprises:
   inputting the first matrix of the image data into a first trained identifying network for the traffic sign to identify the position of the traffic sign from the first matrix of the image data; wherein a network weight of the first trained identifying network for the traffic sign is a network weight of a first to-be-trained identifying network for the traffic sign after a training of the first to-be-trained identifying network for the traffic sign is completed.

5. The method according to claim 4, wherein before inputting the first matrix of the image data into the first trained identifying network for the traffic sign, the method further comprises:
   obtaining a first training sample set of the original image of the traffic sign, where the first training sample set of the original image is a set of the original images labeled the positions of the traffic signs;

performing the image enhancing processing on each of the original images of the first training sample set to generate a plurality of corresponding enhanced images;

performing a third conversion on each of the original images and a corresponding enhanced image to together form a plurality of third matrixes of the image data;

inputting the third matrixes of the image data into the first to-be-trained identifying network for the traffic sign;

repeating a cycle of training the first to-be-trained identifying network for the traffic sign for a predetermined number of the cycles;

obtaining the network weight of the first to-be-trained identifying network for the traffic sign when the training is completed, to generate the first trained identifying network for the traffic sign.

6. The method according to claim 1, wherein identifying the passage instruction information of the traffic sign from the second matrix of the identified region of the image data further comprises:

inputting the second matrix of the identified region of the image data into a second trained identifying network for the passage instruction information, to identify the passage instruction information of the traffic sign from the second matrix of the identified region of the image data; wherein a network weight of the second trained identifying network for the passage instruction information is a network weight of a second to-be-trained identifying network for the passage instruction information after a training of the second to-be-trained identifying network for the passage instruction information is completed.

7. The method according to claim 6, wherein before inputting the second matrix of the identified region of the image data into the second trained identifying network for the passage instruction information, the method further comprises obtaining a second training sample set of the first identified region of the original image of the traffic sign, where the second training sample set of the first identified region of the original image is a set of the first identified region of the original images labeled positions and types of the passage instruction information of the traffic signs;

performing the image enhancing processing on each of the first identified regions of the original images of the second training sample set to generate a plurality of corresponding identified regions of the enhanced images;

performing a fourth conversion on each of the first identified regions of the original images and a corresponding second identified region of the enhanced image to together form a plurality of fourth matrixes of the identified region of the image data;

inputting the fourth matrixes of the identified region of the image data into the second to-be-trained identifying network for the passage instruction information;

repeating a cycle of training the second to-be-trained identifying network for the passage instruction information for a predetermined number of the cycles;

obtaining the network weight of the second to-be-trained identifying network for the passage instruction information when the training is completed, to generate the second trained identifying network for the passage instruction information.

8. An electronic device comprising:

a storage device;

at least one processor; and the storage device storing one or more programs, which when executed by the at least one processor, cause the at least one processor to:

obtain an original image of a traffic sign;

perform a first conversion on the original image and an enhanced image to together form a first matrix of image data, wherein the enhanced image is formed by an image enhancing processing on the original image;

identify a position of the traffic sign from the first matrix of the image data;

mask the original image and the enhanced image respectively to form a first identified region of the original image and a second identified region of the enhanced image according to the position of the traffic sign; wherein masking the original image and the enhanced image is obscuring other region of the original image and other region of the enhanced image excluding the position of the traffic sign, and remaining the traffic sign in the original image and the traffic sign in the enhanced image;

perform a second conversion on the first identified region of the original image and the second identified region of the enhanced image to together form a second matrix of the identified region of the image data; and identify passage instruction information of the traffic sign from the second matrix of the identified region of the image data, where the passage instruction information is configured to provide guiding information, limitation information, warning information, or indicating information.

9. The electronic device according to claim 8, further causing the at least one processor to:

convert the original image to a grayscale image;

perform a histogram averaging or a deep learning processing on the grayscale image to obtain a grayscale enhanced image.

10. The electronic device according to claim 8, further causing the at least one processor to:

perform a histogram averaging or a deep learning processing on the original image to obtain a RGB color enhanced image.

11. The electronic device according to claim 8, further causing the at least one processor to:

input the first matrix of the image data into a first trained identifying network for the traffic sign to identify the position of the traffic sign from the first matrix of the image data; wherein a network weight of the first trained identifying network for the traffic sign is a network weight of a first to-be-trained identifying network for the traffic sign after a training of the first to-be-trained identifying network for the traffic sign is completed.

12. The electronic device according to claim 11, further causing the at least one processor to:

obtain a first training sample set of the original image of the traffic sign, where the first training sample set of the original image is a set of the original images labeled the positions of the traffic signs;

perform the image enhancing processing on each of the original images of the first training sample set to generate a plurality of corresponding enhanced images;

perform a third conversion on each of the original images and a corresponding enhanced image to together form a plurality of third matrixes of the image data;

input the third matrixes of the image data into the first to-be-trained identifying network for the traffic sign;

repeat a cycle of training the first to-be-trained identifying network for the traffic sign for a predetermined number of the cycles;

obtain the network weight of the first to-be-trained identifying network for the traffic sign when the training is completed, to generate the first trained identifying network for the traffic sign.

13. The electronic device according to claim 8, further causing the at least one processor to:

input the second matrix of the identified region of the image data into a second trained identifying network for the passage instruction information, to identify the passage instruction information of the traffic sign from the second matrix of the identified region of the image data; wherein a network weight of the second trained identifying network for the passage instruction information is a network weight of a second to-be-trained identifying network for the passage instruction information after a training of the second to-be-trained identifying network for the passage instruction information is completed.

14. The electronic device according to claim 13, further causing the at least one processor to:

obtain a second training sample set of the first identified region of the original image of the traffic sign, where the second training sample set of the first identified region of the original image is a set of the first identified region of the original images labeled positions and types of the passage instruction information of the traffic signs;

perform the image enhancing processing on each of the first identified regions of the original images of the second training sample set to generate a plurality of corresponding identified regions of the enhanced images;

perform a fourth conversion on each of the first identified regions of the original images and a corresponding second identified region of the enhanced image to together form a plurality of fourth matrixes of the identified region of the image data;

input the fourth matrixes of the identified region of the image data into the second to-be-trained identifying network for the passage instruction information;

repeat a cycle of training the second to-be-trained identifying network for the passage instruction information for a predetermined number of the cycles;

obtain the network weight of the second to-be-trained identifying network for the passage instruction information when the training is completed, to generate the second trained identifying network for the passage instruction information.

15. A non-transitory storage medium storing a set of commands, when the commands being executed by at least one processor of an electronic device, causing the at least one processor to:

obtain an original image of a traffic sign;

perform a first conversion on the original image and an enhanced image to together form a first matrix of image data, wherein the enhanced image is formed by an image enhancing processing on the original image;

identify a position of the traffic sign from the first matrix of the image data;

mask the original image and the enhanced image respectively to form a first identified region of the original image and a second identified region of the enhanced image according to the position of the traffic sign; wherein masking the original image and the enhanced image is obscuring other region of the original image and other region of the enhanced image excluding the position of the traffic sign, and remaining the traffic sign in the original image and the traffic sign in the enhanced image;

perform a second conversion on the first identified region of the original image and the second identified region of the enhanced image to together form a second matrix of the identified region of the image data; and identify passage instruction information of the traffic sign from the second matrix of the identified region of the image data, where the passage instruction information is configured to provide guiding information, limitation information, warning information, or indicating information.

16. The non-transitory storage medium according to claim 15, further causing the at least one processor to:

convert the original image to a grayscale image;

perform a histogram averaging or a deep learning processing on the grayscale image to obtain a grayscale enhanced image.

17. The non-transitory storage medium according to claim 15, further causing the at least one processor to:

perform a histogram averaging or a deep learning processing on the original image to obtain a RGB color enhanced image.

18. The non-transitory storage medium according to claim 15, further causing the at least one processor to:

input the first matrix of the image data into a first trained identifying network for the traffic sign, to identify the position of the traffic sign from the first matrix of the image data; wherein a network weight of the first trained identifying network for the traffic sign is a network weight of a first to-be-trained identifying network for the traffic sign after a training of the first to-be-trained identifying network for the traffic sign is completed.

19. The non-transitory storage medium according to claim 18, further causing the at least one processor to:

obtain a first training sample set of the original image of the traffic sign, where the first training sample set of the original image is a set of the original images labeled the positions of the traffic signs;

perform the image enhancing processing on each of the original images of the first training sample set to generate a plurality of corresponding enhanced images;

perform a third conversion on each of the original images and a corresponding enhanced image to together form a plurality of third matrixes of the image data;

input the third matrixes of the image data into the first to-be-trained identifying network for the traffic sign;

repeat a cycle of training the first to-be-trained identifying network for the traffic sign for a predetermined number of the cycles;

obtain the network weight of the first to-be-trained identifying network for the traffic sign when the training is completed, to generate the first trained identifying network for the traffic sign.

20. The non-transitory storage medium according to claim 15, further causing the at least one processor to:

input the second matrix of the identified region of the image data into a second trained identifying network for the passage instruction information, to identify the passage instruction information of the traffic sign from the second matrix of the identified region of the image data; wherein a network weight of the second trained identifying network for the passage instruction information is a network weight of a second to-be-trained identifying network for the passage instruction information after a training of the second to-be-trained identifying network for the passage instruction information is completed.

\* \* \* \* \*